US006289203B1

(12) United States Patent
Smith et al.

(10) Patent No.: US 6,289,203 B1
(45) Date of Patent: Sep. 11, 2001

(54) METHOD OF CALCULATING SIGNAL PROPAGATION LOSS AND CREATING A DATA BASE THEREFOR

(75) Inventors: Jack Anthony Smith, Bedford; John Douglas Reed, Arlington; Adam Dewhirst, Austin, all of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/030,091

(22) Filed: Feb. 25, 1998

(51) Int. Cl.[7] ........................................ H04Q 7/20
(52) U.S. Cl. ............................. 455/67.1; 455/423
(58) Field of Search .................... 455/67.1, 67.3, 455/67.4, 67.5, 67.7, 423, 446

(56) References Cited

U.S. PATENT DOCUMENTS

| | | | |
|---|---|---|---|
| 5,179,722 | * 1/1993 | Gunmar et al. | 455/67.7 |
| 5,491,644 | * 2/1996 | Pickering et al. | 455/67.4 |
| 5,561,841 | * 10/1996 | Markus | 455/67.7 |
| 5,828,960 | * 10/1998 | Tang et al. | 455/466 |
| 5,953,669 | * 9/1999 | Stratis et al. | 455/67.3 |

OTHER PUBLICATIONS

Net Plan RF Engineering User's Manual, Release 3.1, 1197, Motorola Inc.
Census Feature Class Codes, tiger/line files, 1995 Technical Documentation, Bureau of the Census, Washington DC, 1996.
1996 IEEE 46th Vehicular Technology Conference Proceedings, vol. 3, IEEE Service Center, 445 Hoes Lane, PO Box 1331, Piscataway, NJ 088855, Cat. Nos.: 96CH35894, 96CB35894.
Wireless Communications Principles and Practice, by T. S. Rappaport, pp. 110–120, 1996, Prentice Hall, upper Saddle River, New Jersey 07458.

* cited by examiner

*Primary Examiner*—Daniel S. Hunter
*Assistant Examiner*—Myron K. Wyche
(74) *Attorney, Agent, or Firm*—Sayed Hossain Beladi; Mario J. Donato, Jr.

(57) ABSTRACT

A method for determining a final propagation loss of a signal transmitted from a transmitter (302) and received at a receiver (303) located in a proximity of a road (340) in a predefined area (350) includes calculating an environmental factor based on a transportation network information associated with predefined area (350), and determining the final propagation loss based on the environmental factor. A method of creating a data base used for calculating the propagation loss includes providing a preliminary data base, calculating a road density constant based on a road profile of predefined area (350), calculating a road constant based on a road classification profile of road (340), calculating the environmental factor by summing the road density constant, and the road constant, and modifying the preliminary data base according to the environmental factor to produce the data base.

13 Claims, 3 Drawing Sheets

METHOD OF CALCULATING SIGNAL PROPAGATION LOSS AND CREATING A DATA BASE THEREFOR

FIELD OF THE INVENTION

The present invention generally relates to a method of calculating propagation loss of a signal and creating a data base therefor.

BACKGROUND OF THE INVENTION

A wireless communication system normally spans its coverage over a wide geographical area. A controller of the communication system maintains an efficient communication system operation by utilizing propagation loss characteristics of the coverage area to calculate a transmitted power level of various transmitters in the coverage area. In addition, propagation loss characteristics are used for initial system layout, system modifications, system rearrangements, site specific parameter adjustments, and adding or eliminating system base station sites. The propagation loss characteristic is affected by terrain of the coverage area. The terrain is very often comprised of different categories of terrain irregularities, and some these irregularities change over time. The terrain irregularities normally are in the form of man-made objects such as buildings, bridges, towers, roads and cars, and natural objects, such as hills, mountains, and trees.

Terrain irregularities have often been given names, such as clutter, and elevation irregularities. Such irregularities are stored in one or more data profiles. The clutter profile generally includes data about objects on the earth's surface such as homes, buildings, trees, and agricultural crops. The United States Geological Survey has categorized the clutter information in many categories and sub-categories. The clutter profile of the coverage area changes more often than the elevation profile. Clutter profile changes very often because man and nature effect the clutter characteristic much easier in a short period of time than the elevation characteristic. When the characterization of the propagation environment is based on an outdated clutter profile, the results are adversely affected. For example, inaccurate signal propagation characterization causes the wireless communication system to operate in a less efficient capacity, resulting in a less optimal system layout design.

Since clutter profiles are expensive, and gathered by time-consuming aerial and land surveys of the coverage area, an up-to-date clutter profile often is unavailable. As such, there is a need for a method of efficiently characterizing a propagation environment without reliance on up-to-date clutter information, and creating a data base therefor.

DETAILED DESCRIPION OF THE PREFERRED EMBODIMENTS

Figure 1:
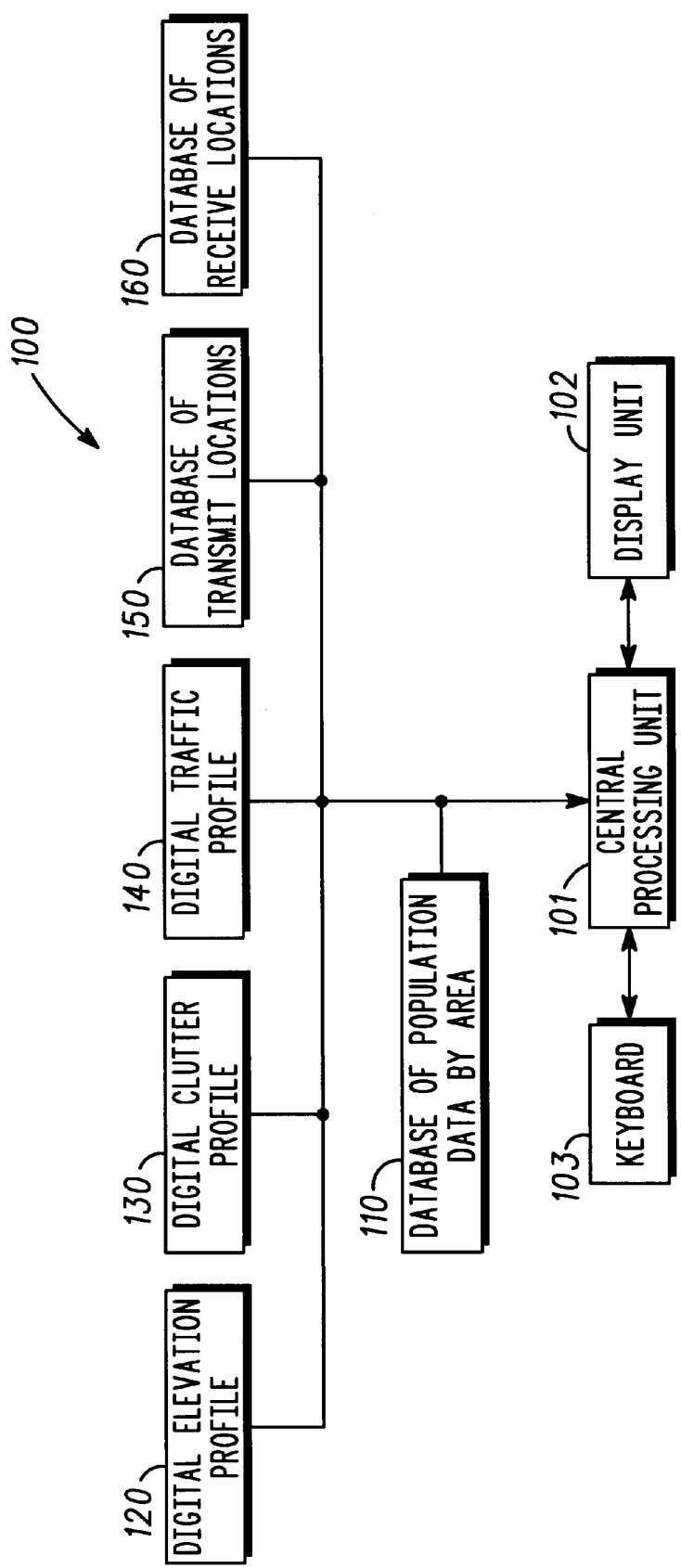
FIG. 1 depicts a block diagram of a computer system having access to data bases for calculating propagation loss of a signal according to various embodiments of the present invention.

According to an embodiment of the present invention, a propagation loss of a signal transmitted from a transmitter and received at a receiver is determined. The receiver in particular is in a predefined area. The predefined area has an elevation profile and a clutter profile. The predefined area may include one or more roads. At first, an environmental factor is calculated based on a road density, a population density, a road constant and a road orientation constant, all associated with the predefined area. In particular, the road constant is based on a predefined road class normally found in the predefined area. The road orientation constant is based on an angle of the signal propagation direction from the transmitter to the receiver and a direction of the road where the receiver has an adequate proximity. The elevation profile is modified according to the environmental factor to produce a modified elevation profile. Finally, the propagation loss is determined based on the modified elevation profile and the clutter profile. In addition to the step of modifying the elevation profile according to the environmental factor, the elevation profile may be modified according to the clutter profile. As an advantage of the present invention, any adverse effect of the clutter profile inaccuracy, due to its possible outdated data, accordingly is reduced. Such a result is possible by a propagation loss determination that is based on the modified elevation profile data.

In another embodiment of the present invention, a propagation loss of a signal transmitted from a transmitter and received at a receiver is determined. The receiver in particular is in a predefined area. The area has an elevation profile and a clutter profile. The predefined area may include one or more roads. At first, an environmental factor is calculated based on a road density, a population density, a road constant and a road orientation constant, all associated with the predefined area. In particular, the road constant is based on a predefined road class normally found in the predefined area. The road orientation constant is based on an angle of the signal propagation direction from the transmitter to the receiver and a direction of a road where the receiver has an adequate proximity. A preliminary propagation loss is determined based on the elevation profile and the clutter profile. Then, the preliminary propagation loss is modified according to the environmental factor to produce the propagation loss. In addition to the step of modifying the preliminary propagation loss according to the environmental factor, the preliminary propagation loss may be modified according to the clutter profile. As an advantage of the present invention, any adverse effect of the clutter profile inaccuracy, due to its possible outdated data, accordingly is reduced. Such a result is possible by a propagation loss determination where its preliminary propagation loss is modified according to the environmental factor.

In another embodiment of the present invention, a propagation loss of a signal transmitted from a transmitter and received at a receiver is determined. The receiver particularly is in a predefined area. The area has an elevation profile and a clutter profile. The predefined area may include one or more roads. At first, a first and second environmental factors are calculated based on a road density, a population density, a road constant and a road orientation constant, all associated with the predefined area. In particular, the road constant is based on a predefined road class normally found in the predefined area. The road orientation constant is based on an angle of the signal propagation direction from the transmitter to the receiver and a direction of a road where the receiver has an adequate proximity. The elevation profile is modified according to the first environmental factor to produce a modified elevation factor. A preliminary propagation loss is determined based on the modified elevation factor and the clutter profile. The preliminary propagation loss is modified according to the second environmental factor to produce the propagation loss. In addition to the step of modifying the elevation profile according to the first environmental factor, the elevation profile may be modified according to the clutter profile. In addition or as an alternative, before the step of modifying the preliminary propagation loss according to the second environmental factor, the preliminary propagation loss may be modified according to the clutter profile. As an advantage of the present invention, any adverse effect of the clutter profile inaccuracy, due to its possible outdated data, accordingly is reduced. Such a result is possible by a propagation loss determination where the elevation profile is modified according to the first envirornental factor, and the resulting preliminary propagation loss is modified according to the second environmental factor.

A method of creating a data base used for calculating a propagation loss of a signal transmitting from a transmitter, receiving by a receiver located in proximity of a road, and propagating through a propagation environment, includes providing a preliminary data base including at least: a location profile of the transmitter, a location profile of the receiver, an elevation profile of the propagation environment, and a road profile of the propagation environment including at least a road density profile and a road classification profile. Further steps include defining an area a surrounding a location of the receiver located within the propagation environment, calculating a road density constant based on the road profile of the area, calculating a road constant based on the road classification profile of the road, calculating an environmental factor by summing the road density constant, and the road constant, and modifying the preliminary data base according to the environmental factor to produce the data base.

According to one or more embodiments of the present invention, where the preliminary data base further includes a clutter profile of the propagation environment, the elevation profile may be modified according to the clutter profile. The preliminary data base further includes a population profile of the propagation environment, and the method further includes a step of calculating a population density constant of the area. The environmental factor then incorporates the population density constant. The method further includes the step of calculating a road orientation constant based on an angle of the signal propagation direction and a direction of the road obtained from the road density profile, and incorporating the road orientation constant in calculating the environmental factor.

In each of these embodiments, the user may selectively remove all or part of the clutter information from the database for the coverage area, or turn off the inclusion of clutter information completely in the propagation loss determination. This decision is based on the user's evaluation of the quality or availability of the clutter data throughout the coverage area.

Referring to FIG. 1, a computer system basic block diagram 100 for calculating a propagation loss of a signal according to various embodiments of the present invention is shown. Computer system 100 normally includes a central processing unit 101, a keyboard 103, and a display unit 102 for possible interaction with a user. Central processing unit 101 has access to various terrain information databases. The databases include population data 110 by area, elevation profile data 120, clutter profile data 130, traffic profile data 140, communication system transmitter locations 150 and receiver locations 160. Elevation profile data 120, clutter profile data 130 and traffic profile data 140 may be in a digital format for ease of usability in the computer system 100. A computer program loaded in computer system 100 calculates propagation loss of a signal transmitted and received in the communication system according to various embodiments of the present invention. The signal is transmitted from a transmitter identified in transmitter locations 150 database and received by a receiver identified in receiver locations 160 database.

Figure 2:
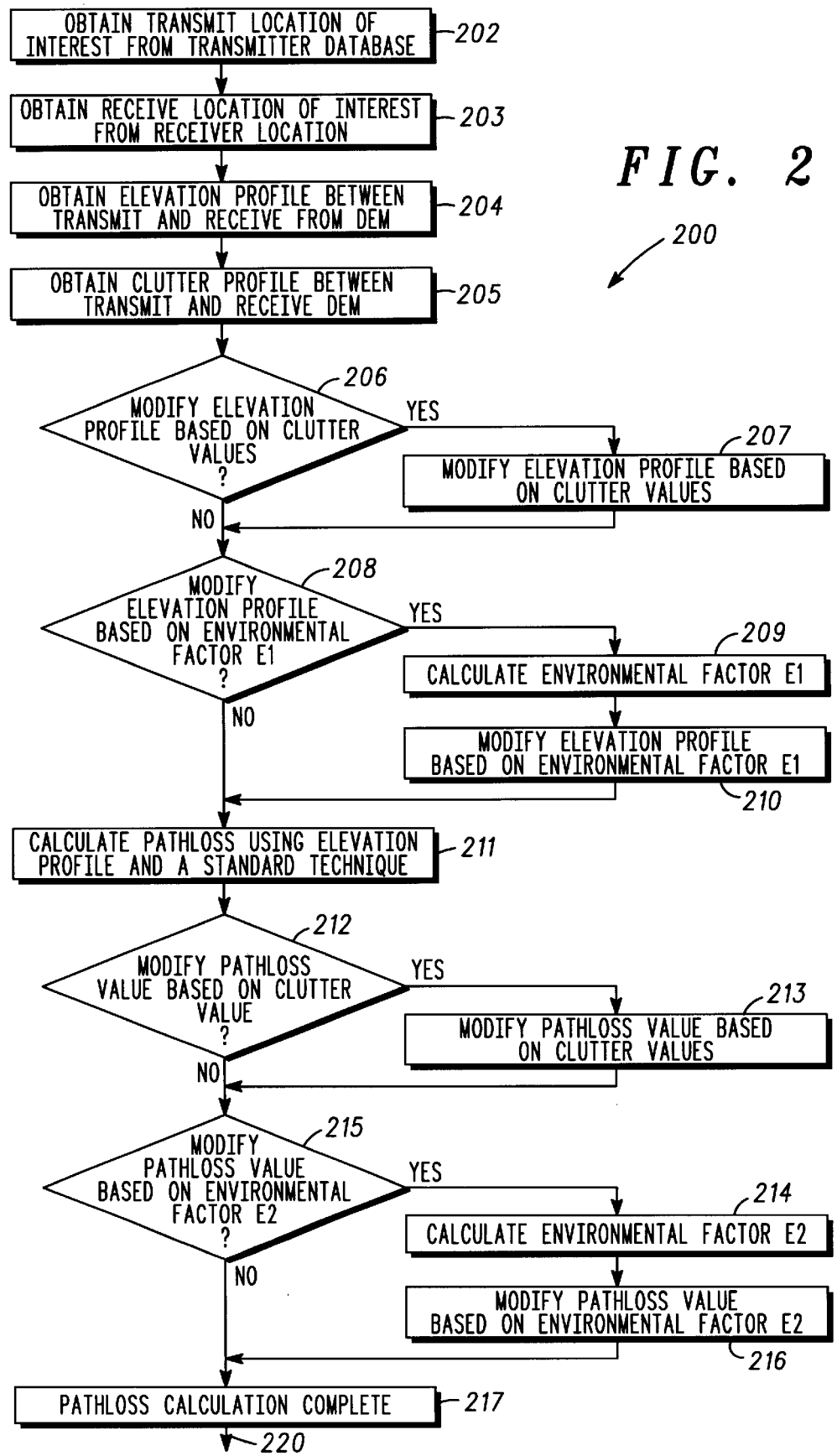
FIG. 2 depicts various combinations of a method for calculating propagation loss of a signal, and creating a data base therefore according to various embodiments of the present invention.

Referring to FIG. 2, a flow chart 200 depicts various combinations of a method, according to various embodiments of the present invention, for calculating propagation loss of a signal. The flow chart is implemented by way of a computer program in computer system 100. To begin the propagation loss calculation, several information parameters must be retrieved from databases accessible by computer system 100. These information parameters are: a transmitter location 202, a receiver location 203, an elevation profile 204 of the signal propagation environment between locations 202 and 203, and a clutter profile 205 of the signal propagation environment between locations 202 and 203. These information parameters 202–205 may be retrieved in any logical order without departing from the scope of the present invention. At step 206, depending on a user selection, the computer program decides whether to modify elevation profile 204 before it passes to a next step. If the decision is positive, elevation profile 204 is modified in 207 according to clutter profile 205. After modification in step 207, a modified version of elevation profile 204 passes to step 208. Otherwise, if the decision at step 206 is negative, elevation profile 204 without any modification passes to step 208. At step 208, depending on a user selection, the computer program decides whether to modify elevation profile 204 according to a first environmental factor (E1). If decision step 208 is positive, E1 factor is calculated at step 209. The details of calculating E1 are explained in the following paragraphs. The elevation profile received at step 208 is modified according to E1 value calculated in step 210. The modified elevation profile at step 210 passes to step 211. Otherwise, if the decision at step 208 is negative, the elevation profile received at step 208 passes to step 211. At step 211, a preliminary path loss 218 of a signal propagated from transmit location 202 and received at receiver location 203 is calculated using a standard path loss calculation method based on the elevation profile received at step 211. Other terrain information parameters may be involved in calculating path loss at step 211, however, they are not shown here. Several methods for calculating path loss at step 211 are available and have been described fully in published literature. Few such methods are Longley-Rice, Durkin's, and Hata; these methods are described in a book titled: *Wireless Communications: Principles and Practice,* by Theodore S. Rappaport, IEEE Press, pp. 110–120.

After path loss 218 is calculated, a decision, according to a user selection, is made in step 212 whether to modify path loss 218 based on clutter information 205. If the decision is positive, path loss 218 is modified at step 213 based on clutter information 205, and the modified path loss at step 213 passes to step 215. Otherwise, if the decision at step 212 is negative, path loss 218 without modification passes to step 215. Next at step 215, a decision is made according to a user selection whether to modify the path loss received at step 215 according to a second environmental factor (E2). If the decision at step 215 is positive, E2 is calculated at step 214, and the received path loss at step 215 is modified according to a value of E2 calculated at step 216. The modified path loss at step 216 passes to a final step 217 for outputting a completed path loss calculation 220. Otherwise, if the decision at step 215 is negative, the received path loss at step 215 passes directly to final step 217 for outputting a completed path loss calculation 220.

To calculate E1 or E2, informations about transportation networks, such as roads, railways, waterways and alike, which are laid out in the signal propagation environment are needed. Normally, such networks are at or near the surface of the earth. In addition, information about population density of the signal propagation environment may be needed when calculating E1 or E2. Databases describing transportation networks and population densities of various areas are readily available. Moreover, these databases are easily and inexpensively updated. According to one advantage of the present invention, use of such inexpensive and updated databases for calculating a propagation path loss involving E1 or E2 eliminates, or reduces, a need for updating clutter information which is expensive and time consuming to obtain. In the event that an off-the-shelf database for the transportation network is not available due to unimportance of the remote or undeveloped area, a road map of the area may be used to generate the transportation network database. Generating a transportation network database is much easier than generating a clutter information database.

E1 or E2 is a function of road density (RD), population density (PD), road category (RC), and road orientation (RD) parameters. Summation of RD, PD, RC and RD, while multiplying a weight factor to each parameter, produces E1 or E2. Although the weight factors or value of parameters may be different for E1 and E2 calculations, a process of calculating E1 is equally applicable to a process of calculating E2.

Figure 3:
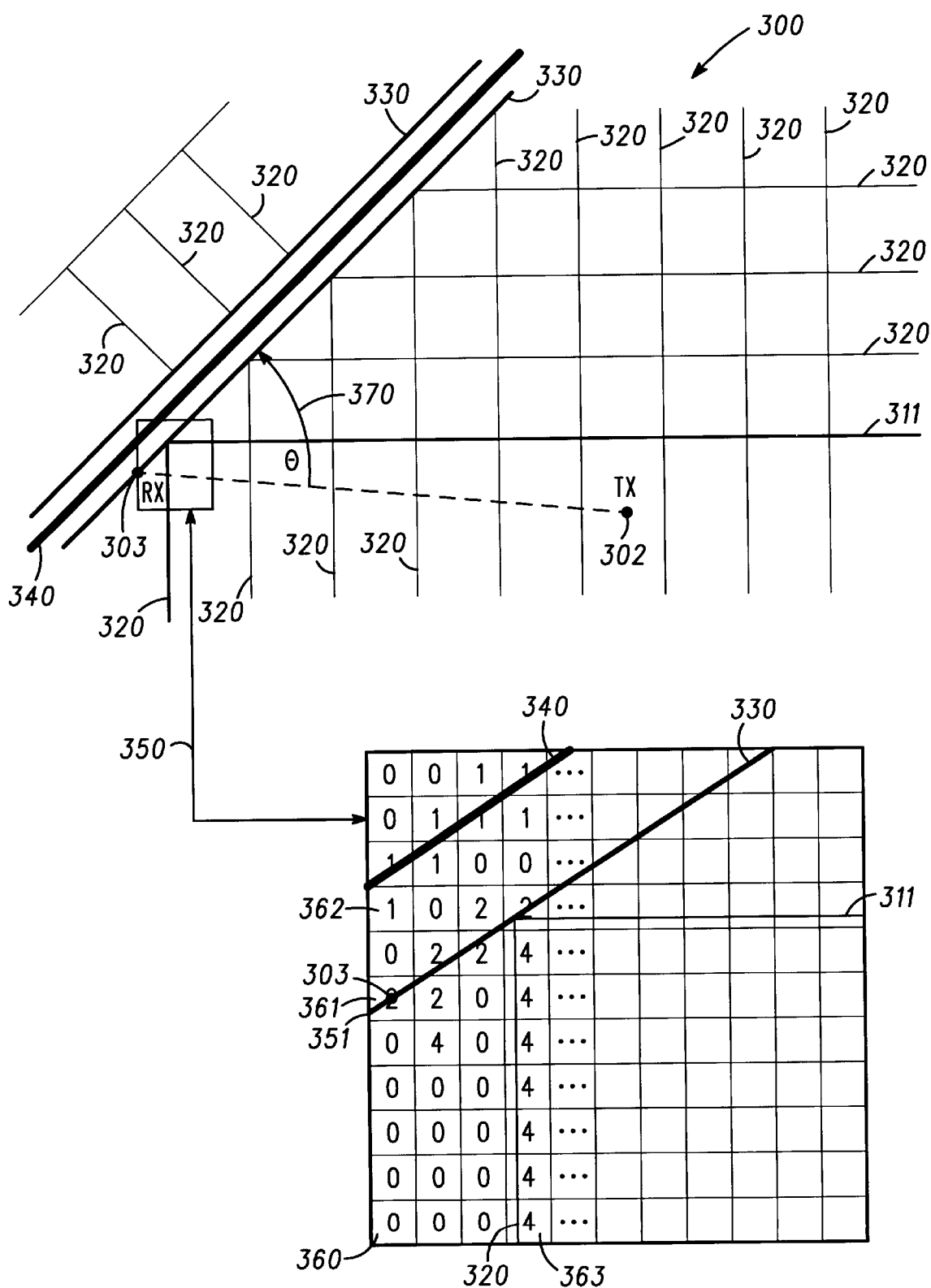
FIG. 3 depicts a transportation network and its elements for calculating an environmental factor according to various embodiments of the present invention.

Referring to FIG. 3, a transportation network is illustrated. A transportation network may include many different categories of transportation networks such as roads, waterways, and alike. Furthermore, each category of transportation network may be divided into many classifications. For example, the Census Feature Class Code (CFCC) classification system, available from the United States Geological Survey, provides approximately 44 different classifications of roads. Primary highways with and without limited access, secondary and connecting roads, local and neighborhood roads are several examples of such road classifications. FIG. 3 depicts a road network 300 which is comprised of a number of small roads 320, generally indicating a residential road class, a number of medium sized roads 330, generally indicating a secondary and connecting road class, and a large road 340, generally indicating a primary highway class. It may be observed in FIG. 3 that each road class is shown by a different line thickness.

A subregion 350 is selected for further analysis of the transportation network between a receiver location 303 and a transmitter location 302. Subregion 350 at least includes receiver 303. Receiver 303 may be a cellular mobile receiver, and transmitter 302 may be a cellular base station in a cellular communication system. Subregion 350 lies primarily along a signal propagation path between transmitter 302 and receiver 303. Subregion 350 is selected such that receiver 303 lies generally at an edge or near an edge of an area defined by subregion 350. An edge 351 is shown to be the nearest edge to receiver 303. Also, edge 351 of subregion 350 is on a side of subregion 350 that is furthest from transmitter 302. It is envisioned that the size, shape and relationship of subregion 350 containing receiver location 303 may be modified to account for terrain fluctuations or unique properties, such as non-uniform road categories or population densities of subregion 350, without departing from the scope of the present invention. The size, shape and relationship of subregion 350 containing receiver 303 location may be modified, in certain geographical situations, to place edge 351 at a furthest location from transmitter 302 and nearest to receiver 303. Subregion 350 is divided into a number of tiles, such as 360, 361, 362, and 363. A nominal size of a square tile is approximately 100 m on a side. However, other tile shapes and sizes may be used. Each tile is evaluated according to a road that lies within the tile. If more than one road is contained within a tile, the largest road is used for evaluating the tile. To evaluate a tile is to assign a reference number to the tile. The reference number is selected according to the CFCC road classification of the road lying in the tile. For example, tile 360 does not contain any road, therefore, it is assigned a tile reference number equal to zero. Tile 361 contains road class 330, a road class of 2 according to CFCC, representing a secondary and connecting road, therefore, it is assigned a reference number equal to two. Tile 362 contains a road class 340, a road class of 1 according to CFCC, representing a primary highway, therefore, it is assigned a tile reference number equal to one. Tile 363 contains a road class 311, a road class of 4 according to CFCC, representing a residential road class, therefore, it is assigned a tile reference number equal to four. Although a CFCC classification system is followed here, any other type of classification system may equally be substituted.

Generally, E1 or E2 may be represented by a summation as follows:

$$a*f(RD)+b*f(PD)+c*f(RC)+d*f(RO),$$

where a, b, c and d are weighting factors. The weighting factors are specified by a user to scale contribution of each parameter in the summation. The f(RD) is a predefined function of the road density (RD). RD defines a percentage number of tiles in subregion 350 that contains a road. The f(RD) is represented by:

$$j-k*RD,$$

where j and k are predefined constants. The f(PD) defines a predefined function of a population density (PD) of subregion 350. The population density PD may be defined according to a time of day, and is normally in unit of people per unit area. The f(PD) is represented by:

$$n-m*PD,$$

where n and m are predefined. The f(RC) is a predefined function of a road class (RC) of a tile where the receiver is located. The RC is the evaluated road class assigned to tile 361. If RC value is greater than or equal to a constant "p" and less than or equal to a constant "q", f(RC) is equal to a constant "r", otherwise, f(RC) is equal to a constant "s". The constants p, q, r and s are predefined. The f(RO) is a predefined function of a road orientation (RO). Each receiver, such as receiver 303, normally is located on or near a road as shown in FIG. 3. The road near receiver 303 would have an orientation angle, theta, 370 with respect to a line of signal propagation from transmitter 302 to receiver 302. The f(RO) is represented by:

$$t*cos(theta),$$

where t is a predefined constant.

To calculate E1, the constants in f(RD), f(PD), f(RC), and f(RO) are in units of height, such as meter or feet; and to calculate E2, the constants are in unit of decibels.

Accordingly, E1 modifies an elevation profile in units of height, and E2 modifies a propagation loss in units of decibels.

The values of a, b, c, and d, are generally specified for a given range depending on the characteristics of the coverage area. They may also be a function of the values stored in the clutter database for the location being evaluated. The values for a, b, c and d, are designed to adjust contribution of each parameter in E1 and E2. Based on some actual field measurements, the values of a, b, c, and d are adjusted to achieve the minimum root mean squared (rms) error for the propagation prediction of multiple locations throughout a test area. Adjusting or tuning parameters in this way to achieve the best (rms) fit to actual measurements is a well known engineering principal. As such, it is expected that the a, b, c, and d values be different for different areas depending on the nature of the environment, the density of the city, and the size of the roads, and alike. Once a, b, c, and d values are determined for different area, they may be stored in a table. In some cases, for example, the population data 110 may not be available in certain country. Thus, the value for b may be set to zero, so that the contribution from f(PD) would be equal to zero in calculating E1 or E2. The values for a, b, c, and d for calculating E1 and E2 may be different.

A computer program based on various embodiments of the present invention may be incorporated in a simulation tool predicating a cellular communication system coverage area. Such tools, normally, predict signal propagation path loss between a base station and various mobile units in the coverage area. As such, a communication system designer is able to determine the number of users that may be served in the coverage area before base station installation takes place. Moreover, as various objects, such as homes, buildings, bridges and roads are erected or demolished in the coverage area, the system designer is able to maintain the communication system efficiency by assuring adequate service to the users by continuously adjusting the system capacity based on the simulation results. A computer program known as Netplan is available from Motorola Inc. that performs propagation simulation. Information about Netplan is available by contacting Motorola Inc. Technical Education & Documentation, 1501 West Shure Dr., Suite 3223A, Arlington Heights, Ill. 60004. The computer program in Netplan executing methods of various embodiments of the present invention allows the communication system designers a better system planning without resorting to expensive, and often times inaccurate, clutter information. Simulation results show at least 10% improvement in predicting coverage areas when the system is planned by Netplan incorporating various embodiments of the present invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What is claimed is:

1. A method for determining a final propagation loss of a signal transmitted from a trnmitter and received at a receiver located in a proximity of a road in a predefined area, comprising the steps of:
   calculating a first environmental factor based on a transportation network information associated with said predefined area; and
   determining said final propagation loss based on said first environmental factor.

2. The method as recited in claim 1 wherein the step of determining said final propagation loss, said determining is further based on an elevation profile of said predefined area which is modified according to said first environmental factor.

3. The method as recited in claim 1 further comprising the step of calculating a second environmental factor, and wherein the step of determining said final propagation loss, said determining includes determining a preliminary propagation loss based on an elevation profile of said predefined area which is modified according to said first environmental factor, and modifying said preliminary propagation loss according to said second enviromnmental factor to produce said final propagation loss.

4. The method as recited in claim 1 wherein the step of determining said final propagation loss, said determining includes determining a preliminary propagation loss and modifying said preliminary propagation loss according to said first environmental factor to produce said final propagation loss.

5. The method as recited in claim 1 wherein said transportation network information includes a road density information of said predefined area.

6. The method as recited in claim 1 wherein said transportation network information includes a road constant information calculated based on a predefined road class assigned to said road.

7. The method as recited in claim 1 wherein said transportation network information includes a population density information of said predefined area.

8. A method of creating a data base used for calculating a propagation loss of a signal transmitting from a transmitter, receiving by a receiver located in proximity of a road, and propagating through a propagation environment, comprising the steps of:
   providing a preliminary data base including at least,
      a location profile of said transmitter,
      a location profile of said receiver,
      an elevation profile of said propagation environment, and
      a road profile of said propagation environment including at least a road density profile and a road classification profile,
   defining an area surrounding location of said receiver located within said propagation environment;
   calculating a road density constant based on said road profile of said area;
   calculating a road constant based on said road classification profile of said road;
   calculating an environmental factor by summing said road density constant, and said road constant; and
   modifying said preliminary data base according to said environmental factor to produce said data base.

9. The method as recited in claim 8 wherein said preliminary data base further includes a clutter profile of said propagation environment.

10. The method as recited in claim 9 further comprising the step of modifying said elevation profile according to said clutter profile.

11. The method as recited in claim 8 wherein said preliminary data base further includes a population profile of said propagation environment.

12. The method as recited in claim 11 further comprising the step of calculating a population density constant of said area, and incorporating said population density constant in calculating said environmental factor.

13. The method as recited in claim 8 further comprising the step of calculating a road orientation constant based on an angle of said signal propagation direction and a direction of said road obtained from said road direction profile, and incorporating said road orientation constant in calculating said environmental factor.

* * * * *